US011199276B2

(12) United States Patent
Mendez et al.

(10) Patent No.: US 11,199,276 B2
(45) Date of Patent: Dec. 14, 2021

(54) BACKFLOW TESTING DEVICE

(71) Applicant: Arbiter Incorporated, Camas, WA (US)

(72) Inventors: Demian Mendez, Camas, WA (US); Adolfo Jose Wurts, Washougal, WA (US)

(73) Assignee: Arbiter Incorporated, Camas, WA (US)

(\*) Notice: Subject to any disclaimer, the term of this patent is extended or adjusted under 35 U.S.C. 154(b) by 196 days.

(21) Appl. No.: 16/422,772

(22) Filed: May 24, 2019

(65) Prior Publication Data

US 2020/0370677 A1 Nov. 26, 2020

(51) Int. Cl.
*F16K 37/00* (2006.01)
*G01L 15/00* (2006.01)

(52) U.S. Cl.
CPC .......... *F16K 37/0091* (2013.01); *G01L 15/00* (2013.01)

(58) Field of Classification Search
CPC ............................. F16K 37/0091; G01L 15/00
See application file for complete search history.

(56) References Cited

U.S. PATENT DOCUMENTS

| 5,257,208 | A | 10/1993 | Brown et al. |
| 5,713,240 | A | 2/1998 | Engelmann |
| 6,212,937 | B1 * | 4/2001 | Hubert ............. G01K 1/02 73/23.2 |
| 8,463,823 | B2 | 6/2013 | Eisenhauer et al. |
| 9,091,360 | B2 | 7/2015 | Frahm, II |
| 9,476,805 | B2 | 10/2016 | Doran |
| 2014/0266765 | A1 * | 9/2014 | Neeley ............. G08B 5/00 340/691.6 |
| 2015/0051848 | A1 | 2/2015 | Jurkowitz, Jr. |

OTHER PUBLICATIONS

General Electric Co., DPI 705 Series—Druck Handheld Pressure Indicators—Data Sheet, downloaded from https://www.transcat.com/media/pdf/dpi705.pdf on Apr. 17, 2019, pp. 1-4, Transcat, 35 Vantage Point Drive, Rochester, NY 14624.
Watts, Instructions—Watts TK-DL Digital Print-out Test Kit for Backflow Preventer Assemblies, downloaded from www.watts.com on Mar. 22, 2019, pp. 1-8, copyright 2013.

(Continued)

*Primary Examiner* — Peter J Macchiarolo
*Assistant Examiner* — Anthony W Megna Fuentes
(74) *Attorney, Agent, or Firm* — J. Douglas Wells; McCoy Russell LLP

(57) ABSTRACT

A handheld-sized, single-hand-holdable, single-hand-operable battery-powered digital backflow prevention assembly testing gage capable of measuring a differential pressure between high and low side fluid sources, providing a capture value function for easily recording pressure values while continuing display of live pressure measurements, and providing a rate of change graph display for immediate visual indication of changes in the differential pressure being sensed. The design utilizes a true differential pressure sensor for more accurate measurements, provides for use as a 5-valve, 3-valve, or 2-valve tester conforming to standard industry field testing procedures, and permits wireless transmission of measurement and related data as well as remote wireless calibration of the testing device.

20 Claims, 16 Drawing Sheets

(56) References Cited

OTHER PUBLICATIONS

Watts, Watts TK-99D Digital Backflow Preventer Test Kit Delta Lite, instruction sheet, downloaded from www.watts.com on Mar. 22, 2019, pp. 1-4, copyright 2008, Watts, 815 Chestnut St., No. Andover, MA 01845.
American Backflow Specialties, Duke Model EZ 900 Test Kit, product sheet, downloaded from www.americanbackflow.com on Mar. 22, 2019, p. 1.
Duke Products, Duke EZ-900 Backflow Test Gauge, product information, downloaded from www.americanbackflow.com on Mar. 22, 2019, p. 1, Duke Products, 3940 Home Avenue, San Diego, CA 92105, www.dukeproducts.net.
Gould Instruments Pty Ltd, Model GI-DBT1, product introduction announcement, downloaded from https://www.gouldinstruments.com.au/new-next-generation-backflow-test-system/ on Apr. 17, 2019, pp. 1-3, Gould Instruments Pty Ltd, 4 Castorina Court, Garbutt QLD 4814, PO Box 126, Aitkenvale QLD 4814.

* cited by examiner

BACKFLOW TESTING DEVICE

CROSS-REFERENCE TO RELATED APPLICATIONS

None.

BACKGROUND OF THE INVENTION

The technical field of invention relates to test equipment for measuring pressures associated with backflow prevention assemblies. More particularly, the present invention pertains to a hand-held, single-hand-sized backflow testing device for measuring fluid pressure and fluid pressure differentials, and for testing fluid control devices such as vacuum breakers, check valves, and pressure relief valves.

Several different designs for backflow testing devices have been disclosed in various publications and products. The different designs provide various features and capabilities. For example, the Manual of Cross-Connection Control, published in its first edition in 1960 and now (most recently) in its tenth edition in 2009 by the Foundation for Cross-Connection Control and Hydraulic Research, a division of the University of Southern California ("Manual of Cross-Connection Control" or "MCCC" or "USC FCCCHR") includes comprehensive field test procedures for 2-valve, 3-valve, and 5-valve configuration field test kits. As disclosed in the USC FCCCHR, each test kit comprises an analog dial differential pressure gage for measuring a pressure differential between a high side fluid line and a low side fluid line. The 2-valve configuration includes two valves and four connections—a high side bleed valve and port, a high side port, a low side bleed valve and port, and a low side port. The 3-valve configuration includes three valves and three connections—a high side port, a high side bleed valve, a bypass control valve and port, a low side bleed valve, and a low side port. And the 5-valve configuration includes five valves and five connections—a high side bleed valve and port, a high side port, a high side control valve, a bypass control valve and port, a low side control valve, a low side port, and a low side bleed valve and port. Each of these analog dial type gage test kits are very basic, non-electronic devices, offering only continuous live analog pressure readings.

U.S. Pat. No. 5,257,208 by Brown et al. ("Brown") discloses a computerized portable testing device that displays and prints pressure values (of a high side and a low side) and their (calculated) difference (i.e. a calculated pressure differential). The device in Brown comprises two valves and four connections—a high side bleed valve and port, a high side port, a low side bleed valve and port, and a low side port. A "Transducer A" is used to measure a high side pressure, and a "Transducer B" is used to measure a low side pressure. And an "A–B" calculated pressure difference is presented as a differential pressure or apparent pressure drop. The device disclosed in Brown also includes a "display hold" button that causes the pressure readings on the display to remain unchanged while the button is depressed.

The Watts TK-DL digital print-out test kit for backflow preventer assemblies comprises the form, function, and features of the device disclosed and described in Brown. Also referenced in Brown is a backflow testing device from Duke Products. Similar to Brown and the Watts TK-DL devices, the Duke Model EZ 900 comprises two valves and four connections—an "A" or high side inlet, a high side bleed (or vent) valve and port (vent), a "B" or low side inlet, and a low side bleed (or vent) valve and port (vent). A first transducer measures pressure in fluid line "A", and a second transducer measures pressure in fluid line "B". A subtractive calculated "A–B" differential pressure is displayed, along with values for the pressure in line "A" and the pressure in line"B". The Duke Model EZ 900 includes a "Hold" button that, like the Watts TK-DL, causes the pressure readings on the display to remain unchanged.

Another device is the Watts TK-99D digital backflow preventer test kit, which comprises three valves and three connections—an "A" side port, an "A" side bleed valve, a bypass control valve and port, a "B" side bleed valve, and a "B" side port. As in the Watts TK-DL, Brown, and Duke Model EZ 900, the Watts TK-99D device comprises two separate ("A" and "B") pressure sensors and provides the subtractive difference "A–B" as differential pressure. Other than separate single function on and off buttons, the Watts TK-99D includes no other button controllable functions or features.

US patent application publication no. US 2015/0051848 by Jurkowitz ("Jurkowitz"), published Feb. 19, 2015, with applicant identified as Nicholson Labs, Inc., discloses an electronic tester comprising five valves and four connections—a high side port, a high side control valve, a bypass control valve and port, a low side control valve, a low side port, a low side bleed valve, a high side bleed valve, and a common outlet (port) associated with the low side bleed valve and the high side bleed valve. As in the Watts TK-DL, Brown, Duke Model EZ 900, and Watts TK-99D, the device in Jurkowitz utilizes two separate transducers, one to sense pressure on the high side fluid line, and the other to sense pressure on the low side fluid line. A differential pressure is then calculated as the difference between the values returned by each of the two transducers. Jurkowitz discloses that the device, comprising five valves and four connections, may be configured as either a 3-valve tester or a 5-valve tester, conforming with industry specified testing instructions (such as, for example, those instructions set out in the USC FCCCHR).

Each of the existing backflow testing device designs has disadvantages in terms of cost, complexity of design, ease of use, feature content, method of recommended and actual use, form factor and ergonomics of the device, design aesthetics, and/or other factors. What is needed are designs for a hand-held, single-hand-sized backflow testing device for measuring fluid pressure and fluid pressure differentials, and for testing water control devices such as vacuum breakers, check valves, and pressure relief valves, that address one or more disadvantage of existing designs.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

DETAILED DESCRIPTION OF PREFERRED EMBODIMENTS

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Figure 1:
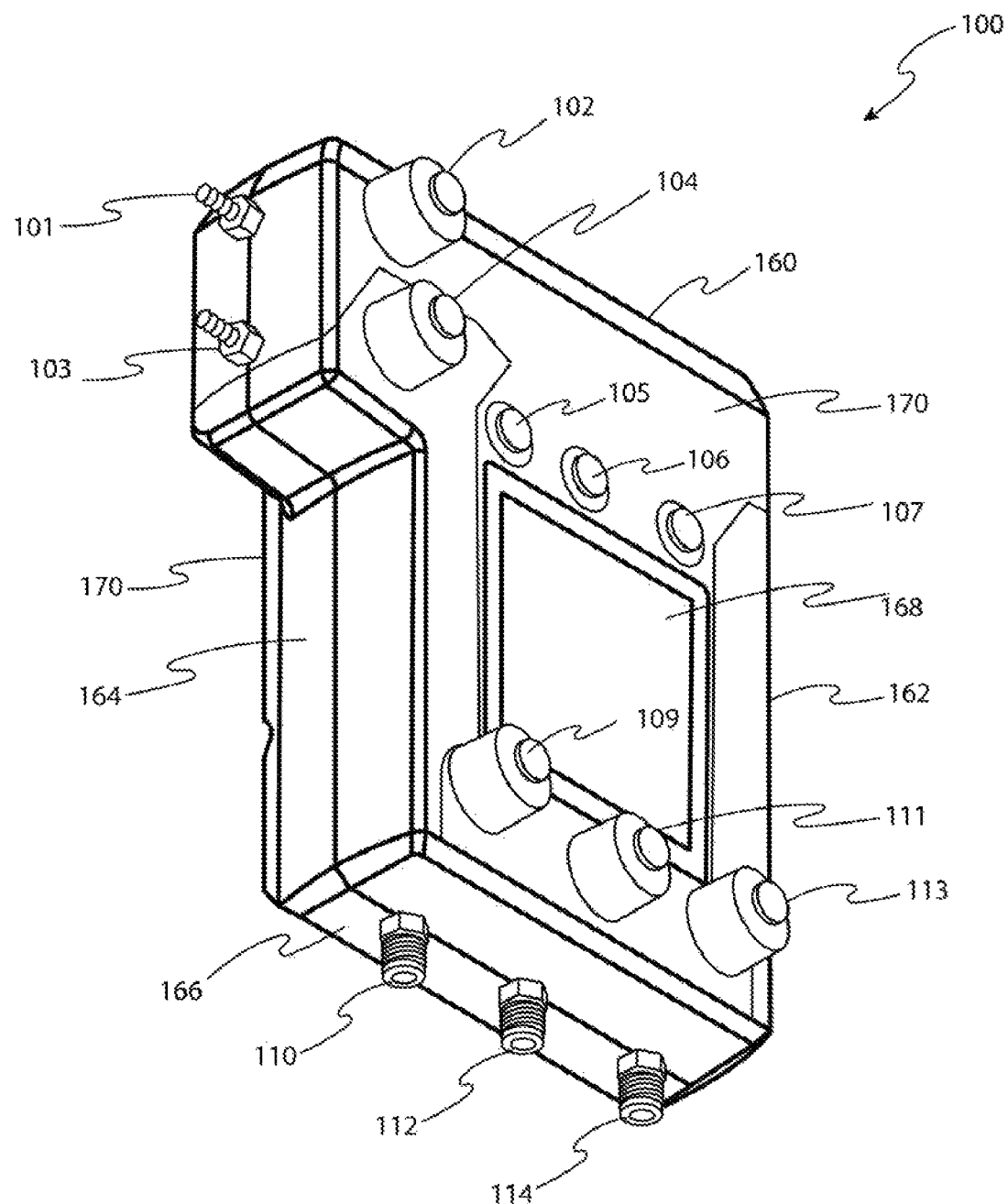
FIG. 1 is a front/left/bottom perspective view of a hand-held backflow testing device, according to preferred embodiments.
Figure 2:
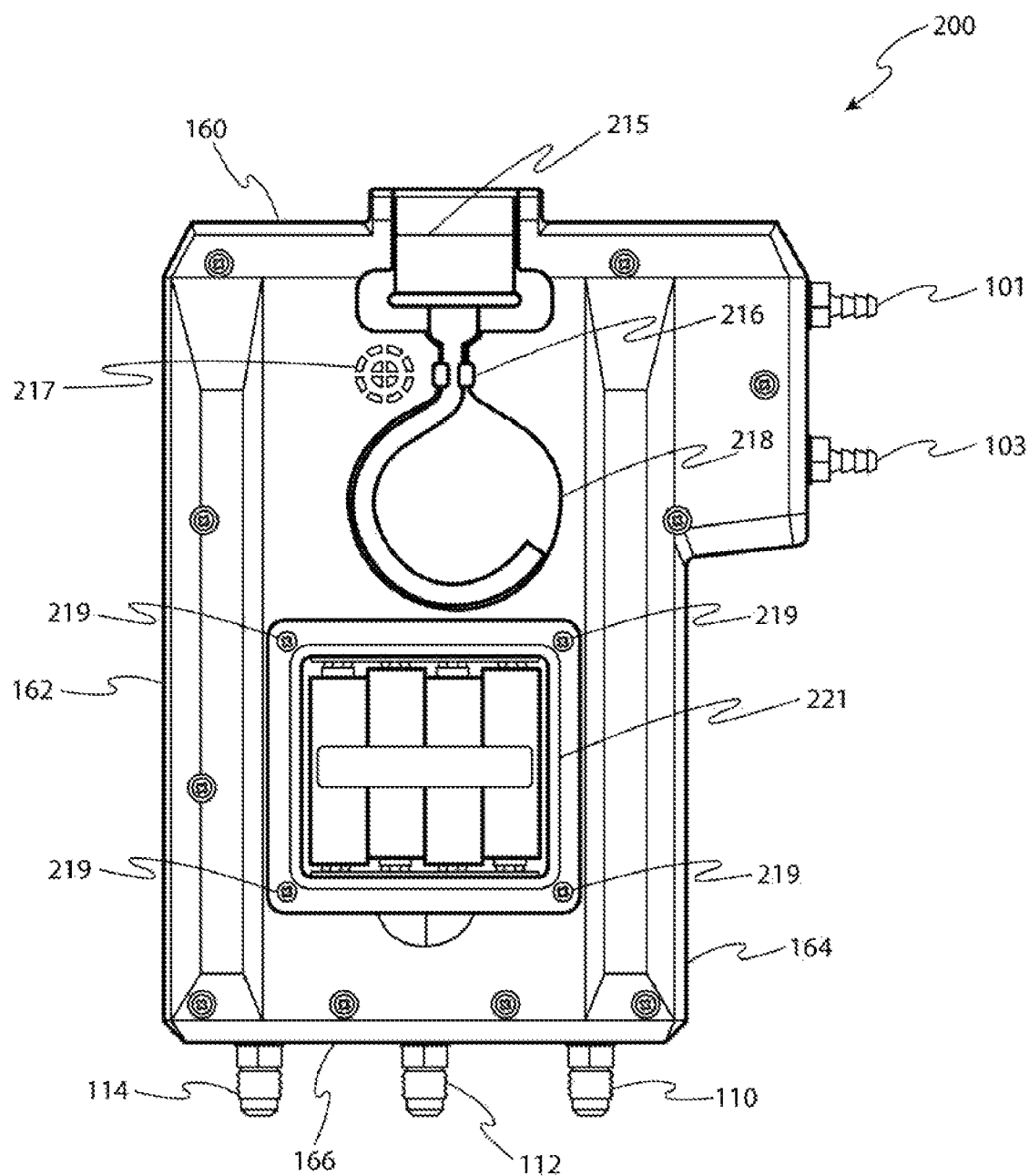
FIG. 2 is a back or rear elevation view of the backflow testing device shown in FIG. 1, according to preferred embodiments.

Preferred embodiments comprise a handheld-sized, single-hand-holdable, single-hand-operable battery-powered backflow prevention assemblies testing device (or gage) that is fluidly connectable to a high side fluid source and to a low side fluid source, and that is capable of measuring the differential pressure between the high and low side fluid sources using a single differential pressure sensor fluidly connected to each of the high and low side fluid sources via respective high and low side fluid lines. A preferred ergonomic form-factor for such a backflow testing device is illustrated in FIGS. 1 and 2, with FIG. 1 showing a front/left/bottom perspective view of such device 100, and FIG. 2 showing a back side of such device 100. Preferred embodiments comprise a capture button 105 and captured value functionality as described with respect to FIGS. 1, 6, and 7. Preferred embodiments comprise rate of change graph (ROCG) display and functionality as described with respect to FIGS. 6 and 9-12. Preferred embodiments comprise a device 100 capable of being configured as any one of a 2-valve tester, a 3-valve tester or a 5-valve tester, conforming with industry specified testing instructions (such as, for example, those instructions set out in the USC FCCCHR), as described with respect to FIGS. 1, 4, 5, and 13. Further, preferred embodiments comprise simple variants of the full 5-valve and 5-connection device 100, which corresponds to the hydraulic circuitry in FIG. 13, including a 3-valve/3-connection device 1400 described in FIGS. 14-15 and a 2-valve/4-connection device 1600 described in FIGS. 16-17, each of the devices 100, 1400, and 1600 conforming with industry specified testing instructions such as those set out in the USC FCCCHR.

Although the preferred embodiments may be described in the context of 5-valve, 3-valve, and 2-valve configurations of an electronic digital backflow testing device each having a combination of the novel innovations described herein—for example, use of a single (true) differential pressure sensor (as opposed to existing designs that use multiple transducers and computing a (subtractive) apparent differential pressure; use of an ergonomic form-factor enabling single-hand operation for measured value capturing; incorporation of a capture value button and display of both continued live readings and captured values; incorporation of a rate of change graph (ROCG) providing immediate visual queues as to the rate of change in sensed differential pressure; flexibility in a 5-valve/5-connection version of a backflow testing device allowing the device to be used in a 5-valve configuration, or a 3-valve configuration, or a 2-valve configuration (in conformance with industry field testing standards); and a simplicity of design (i.e. reduced complexity) enabling the backflow device to be manufactured and sold in 5-valve/5-connection, 3-valve/3-connection, and 2-valve/4-connection variants—each of the described innovations, among others described herein, are separable and may be applied in different combinations and to devices adapted for other, non-backflow testing applications.

A front/left/bottom perspective view of a hand-held backflow testing device 100 is illustrated in FIG. 1, according to preferred embodiments. As shown, the device 100 preferably comprises a hand-held sized housing having a top 160, bottom 166, left side 164, right side 162, front 170 and back 172. The present inventors discovered that the layout of connections, controls, and interfaces, as illustrated, provide improved ergonomics and an easier to use form factor. The housing is preferably sized to permit single hand operation of at least the capture value button 105 and preferably also the back button 106, and the power/backlight button 107. A display 168 is preferably centrally located, as shown, on the front 170 of the device 100. The housing of device 100 is preferably shaped as illustrated, with an upper portion protruding from the left side 164, having low side and high side bleed ports 101, 103 on an upper left side face of the housing and corresponding low side bleed port and high side bleed port knobs 102, 104 on an upper left front face portion. The housing is preferably shaped as shown so that a user may hold the device 100 in a left hand along its left side 164 just below the high and low side bleed ports 103, 101, with the user's fingers wrapped around to engage with the back 172 and structures and features thereon, and easily depress either the capture value button 105 or back button 106 on the front 170 of the device using the left thumb. The user may then adjust any one of the knobs 102, 104, 109, 111, 113 using the other (free) hand, with high side port 110, bypass port 112, and low side port 114 connections extending from the bottom 166 of the device 100.

Each of the knobs (for opening and closing a fluid flow controlling valve) is preferably located directly in view and proximate to the port/connection that the knob (and valve) affects. As illustrated in FIG. 1, all of the knobs 102, 104, 109, 111, and 113 are preferably on the front 170 of the device, and each of the respective ports/connections 101, 103, 110, 112, and 114, respectively, are preferably immediately in view and proximate to the knob that controls fluid flow for the particular port/connection. As shown, low side bleed port knob 102 is proximate to low side port 101; high side bleed port knob 104 is proximate to high side port 103; high side pressure port knob 109 is proximate to high side pressure port 110; bypass control knob 111 is proximate to bypass port 112; and low side pressure port knob 113 is proximate to low pressure port 114.

The present inventors discovered that the form-factor depicted in FIG. 1 (and FIGS. 2, 14, and 16) is more effective and practical for the user/technician than existing electronic or digital devices, or more traditional test kit designs comprising a central (typically analog) gage and (exposed/non-housing enclosed) valving manifolds surrounding the gage. In operation, all or at least one of the connections 101, 103, 110, 112, and 114 may be connected to tubing or hoses. For example, tubing may be connected to bleed ports 103, 101, for redirecting fluid directed through those ports, and hoses are preferably connected to the high side, bypass, and low side ports 110, 112, 114, respectively. Tubing or hoses connected to the ports/connections 101, 103, 110, 112, and 114 extend away from the sides of the device 100 either vertically (such as to the left from ports 101 and 103) or downward (such as from ports 110, 112, and 114), as opposed to upward and/or rearward. Consequently, all fluid paths into and out of the device 100 (as well as any knobs controlling valves that affect those fluid paths) are immediately visible by a technician when looking at the backflow testing device 100 from the front 170.

Conventional test kits use hoses that are color coded, with red-colored hose used for fluid connection to a high side fluid line to be tested, a yellow-colored hose to be fluidly connected with a bypass fluid test connection, and a blue-colored hose to be fluidly connected to a low side fluid line to be tested. The knobs 102, 104, 109, 111, and 113 preferably incorporate color to match their corresponding operation. High side bleed port knob 104 and high side port knob 109 may incorporate the color red to indicate their connection to the high side fluid line under test. The bypass port knob 111 may incorporate the color yellow to match a yellow colored hose connected to the bypass port 112. And the low side bleed port knob 102 and low side port knob 113 may incorporate the color blue to indicate their connection the low side fluid line under test.

The present inventors discovered that orienting the fluid connections and corresponding valves in a consistent relation to the technician and in a consistent fashion as compared to industry specified testing instructions (such as, for example, those instructions set out in the USC FCCCHR), improved ease of use of the device. Fluid (or water) control devices such as vacuum breakers, check valves, and pressure relief valves, are typically illustrated in hydraulic schematics or diagrams with the direction of fluid flow going from left to right, from regions of high pressure to (in typical operation) regions of (expected) lower pressure, or from a supply source to an intended discharge or destination. Preferably, as shown in FIG. 1, the high side connections and ports are positioned closest to the technician's left hand while gripping the device 100 in a left hand along the side 164 of the device, and the low side connections and ports are farther away (either upward or to the right) from the technician's left hand while gripping the device in a left hand along the side 164. For example, the high side port/connection 110 is preferably positioned on the left portion of the bottom 166, and the low side port/connection 114 is preferably positioned on the right portion of the bottom 166; similarly, the high side bleed port 103 is positioned closer to the left grip location, and the low side bleed port 101 is positioned farther from the left grip location.

FIG. 2 is a back or rear elevation view 200 of the backflow testing device 100 shown in FIG. 1, according to preferred embodiments. The rearmost surface 172 preferably comprises a narrow ridge extending in a top 160 to bottom 166 direction, and positioned toward a left side 164 of the device 100. A similarly formed second ridge is preferably positioned toward a right side 162 of the device 100, as shown in FIG. 2. The present inventors discovered the ridges provide improved grip when holding the device. The valley formed between the two ridges forms a surface upon which is formed a condensate moisture vent 217, in preferred embodiments. The vent 217 allows condensate moisture to escape from within the device housing and preferably includes porous material that allows moisture to escape from within the device and prevents external water or other fluids from entering the housing. A hook with (nylon) strap 215 is preferably included, stowable within a groove formed in the (valley/back) surface and retained in a stowed position using a retainer clip 216. A battery compartment is preferably formed into this (valley/back) (shown in FIG. 2 with the battery cover removed). A battery cover gasket 221 is preferably used to keep water or other fluid out of the battery compartment when the battery cover is secured in place via battery compartment fasteners 219. A battery cover cutout or lip 220, as shown, is preferably included to simplify removal of the battery cover.

Figure 3:
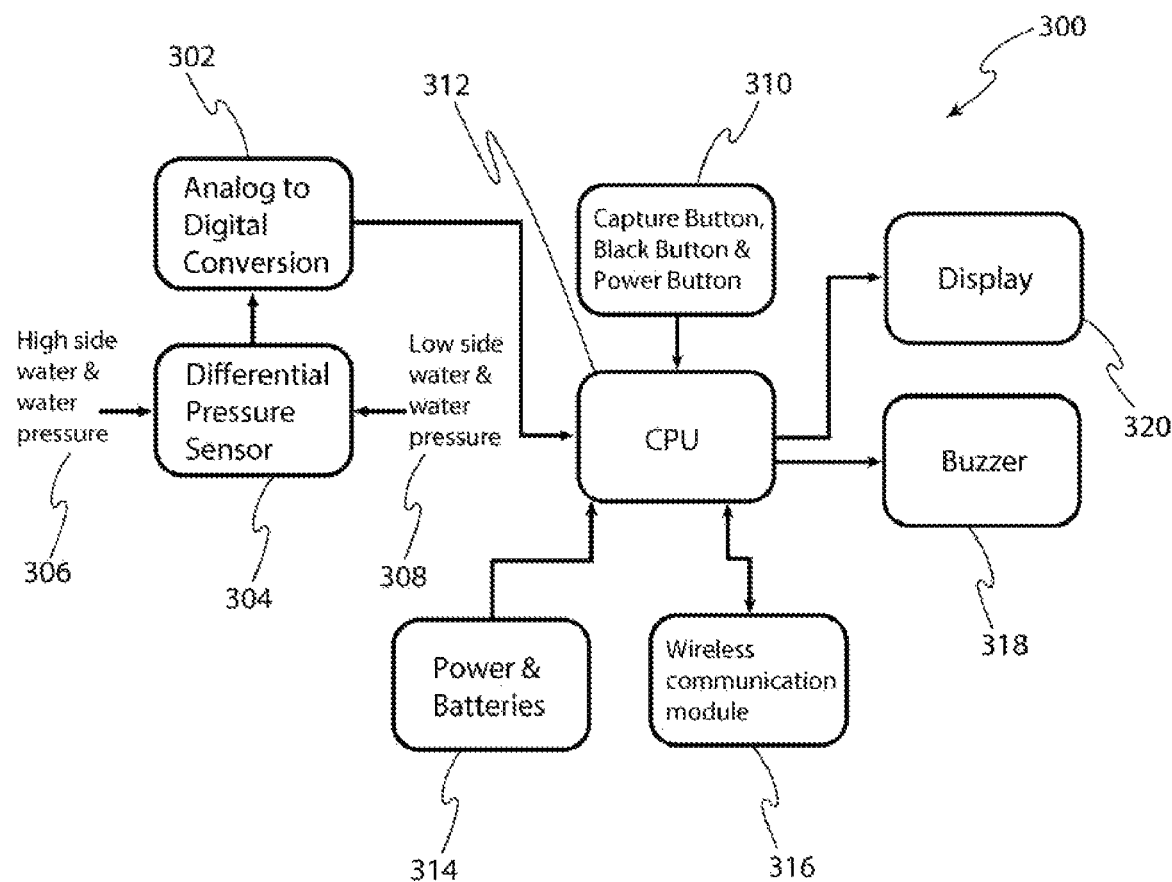
FIG. 3 is a functional block diagram of a backflow device according to preferred embodiments.

FIG. 3 is a functional block diagram 300 of a backflow prevention assembly testing device, such as device 100, according to preferred embodiments. Preferably, a single differential pressure sensor 304 is used for sensing a true differential fluid pressure between a high side 306 and a low side 308. The differential pressure sensor 304 preferably receives high side water and water pressure 306 and low side water and water pressure 308 and generates an analog voltage (or current) that is proportionate to or that varies as a function of the differential pressure between high and low sides. An analog to digital converter (ADC) 302, which may be integral to a differential pressure sensor module, converts the sensor voltage (or current) to a digital number representing a magnitude of the sensed pressure differential. And the digital value (number) is then received by a central processing unit (CPU) (or microprocessor, or microcontroller/MCU/μ-controller) 312.

Known existing electronic/digital backflow testing devices utilize at least two pressure sensors—one to sense a high side pressure, and the other to sense a low side pressure—and calculate a differential pressure as the low side pressure reading subtracted from the high side pressure reading. In less preferred embodiments, the differential pressure sensor 304 may comprise at least two pressure sensors—one to sense a high side pressure and the other to sense a low side pressure—with an apparent differential pressure mathematically calculated as the difference between sensor measurements. However, the present inventor discovered that utilizing a single pressure sensor improves accuracy and reliability, at least in part due to eliminating the additional sources of error caused by using two sensors instead of one. The present inventor realized that a conventional pressure sensor senses a pressure in relation to either a vacuum (for pressure measurements in, for example, PSIA or pounds per square inch absolute) or atmospheric pressure (for pressure measurements in, for example, PSIG or pounds per square inch gage), and that calibrations are critical for obtaining reliable and repeatable pressure readings. The present inventor discovered that by using a differential pressure sensor (whereby a single sensor is measuring a physical pressure difference between two sides of the sensor assembly) improves accuracy by reducing the compounding of errors inherent in multiple sensor devices.

In preferred embodiments, Power for the CPU 312 is preferably provided by power supply or batteries 314. Physical switch or button inputs 310 to the CPU 312 preferably comprise a capture button 105, back button 106, and a power/backlight button 107. The CPU 312 preferably controls a display/display circuitry 320 and a buzzer/speaker 318 for audio alerts/indications. A wireless communications module 316 is preferably provided, comprising circuitry for wirelessly transmitting and receiving data, commands, programming instructions, or other information. In preferred embodiments, a smartphone or mobile device application may be wirelessly coupled with the wireless communications module 316, with the wireless communications module 316 used for wirelessly transmitting captured and live pressure readings, captured value identifier information saved in memory, gage calibration date information saved in memory, and/or other information saved in memory such as gage serial number, firmware version, battery life, and units settings. Gage calibration is preferably adjusted via wireless transmission and use of an app downloaded to a smartphone or mobile device, which the present inventors discovered makes the calibration process easier than with currently available mechanical gages.

Figure 4:
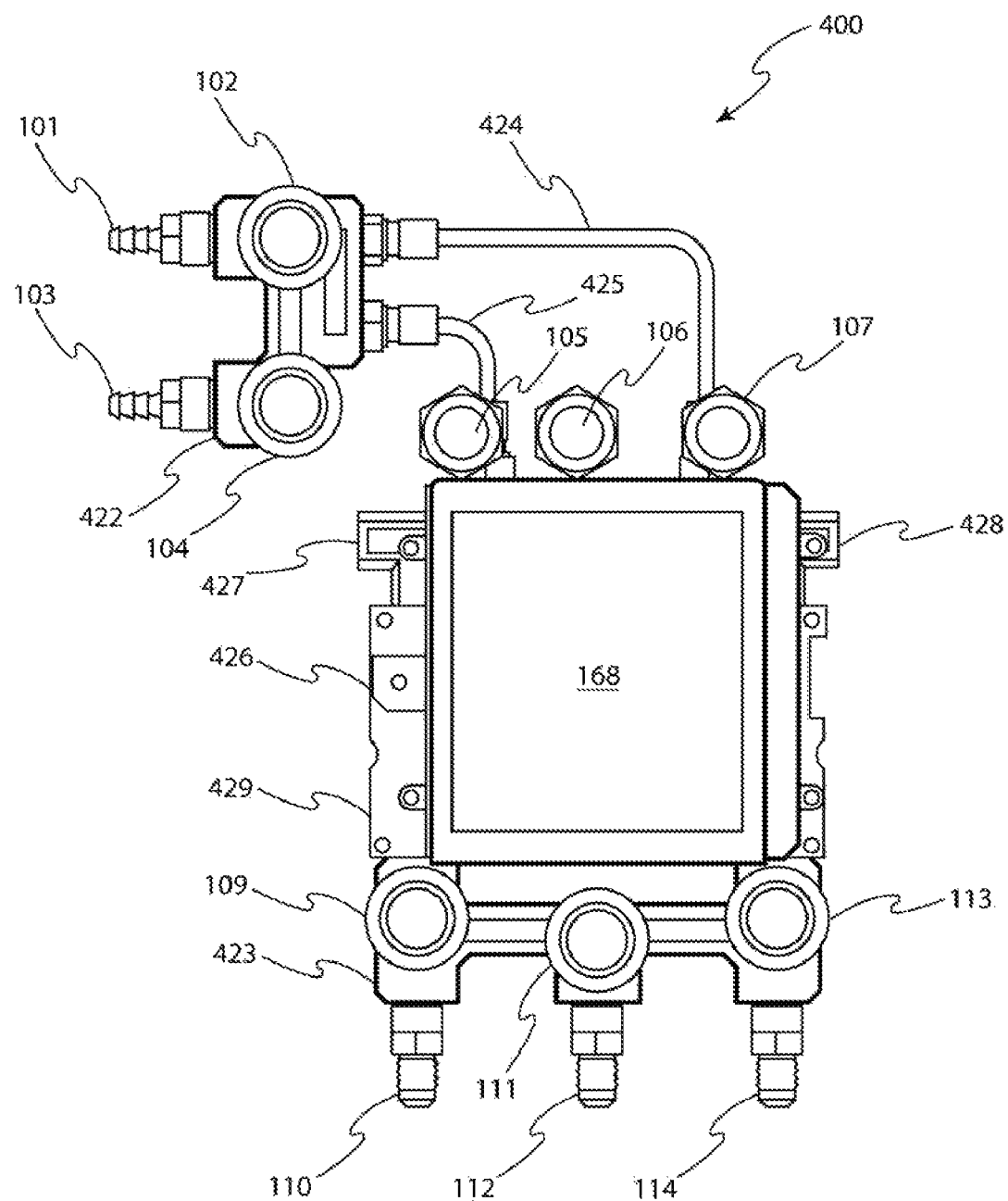
FIG. 4 is an illustration of various components of a backflow device, as viewed from the front and with a housing enclosure hidden, according to preferred embodiments.
Figure 5:
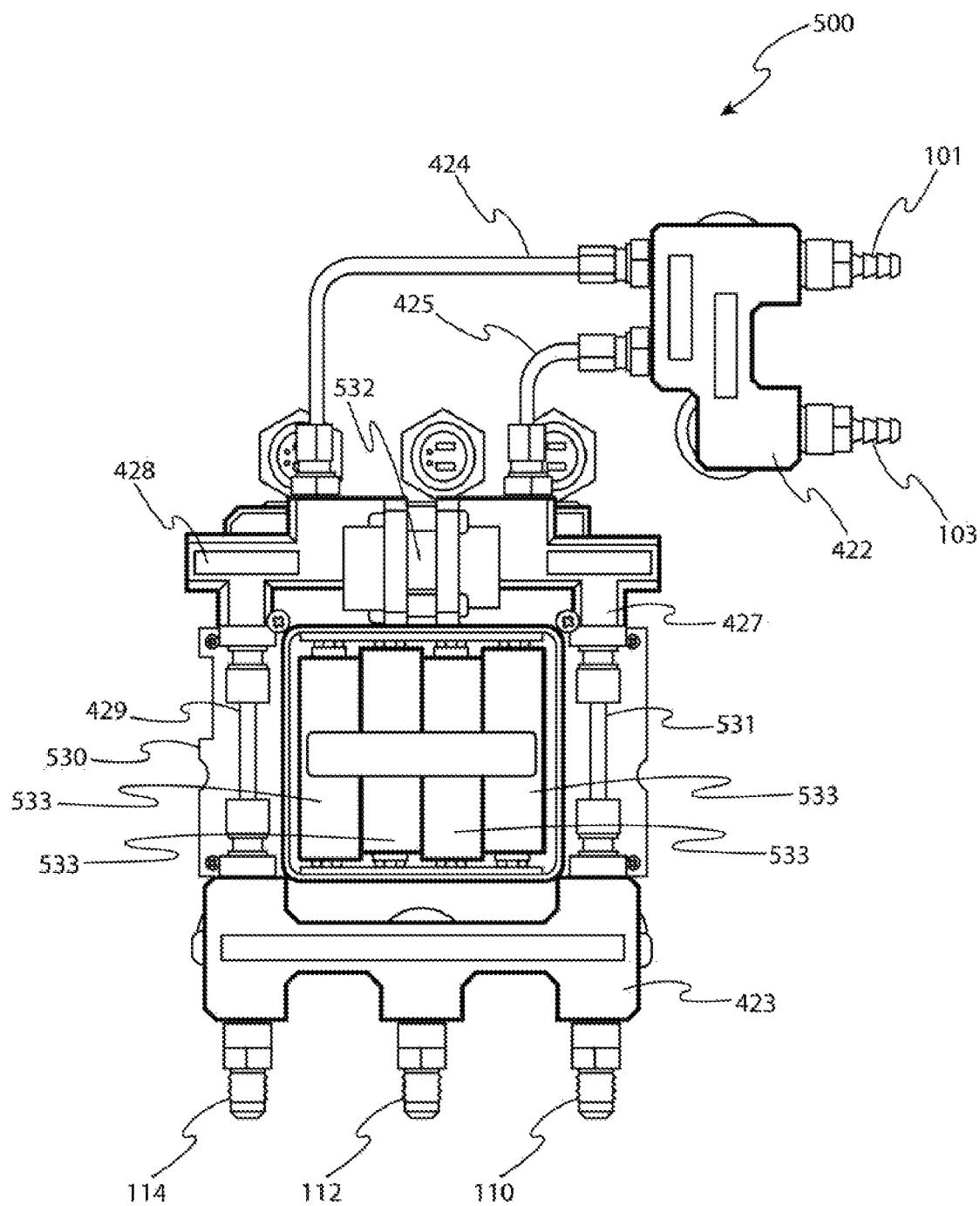
FIG. 5 is an illustration of various components of a backflow device, as viewed from the back and with a housing enclosure hidden, according to preferred embodiments.
Figure 13:
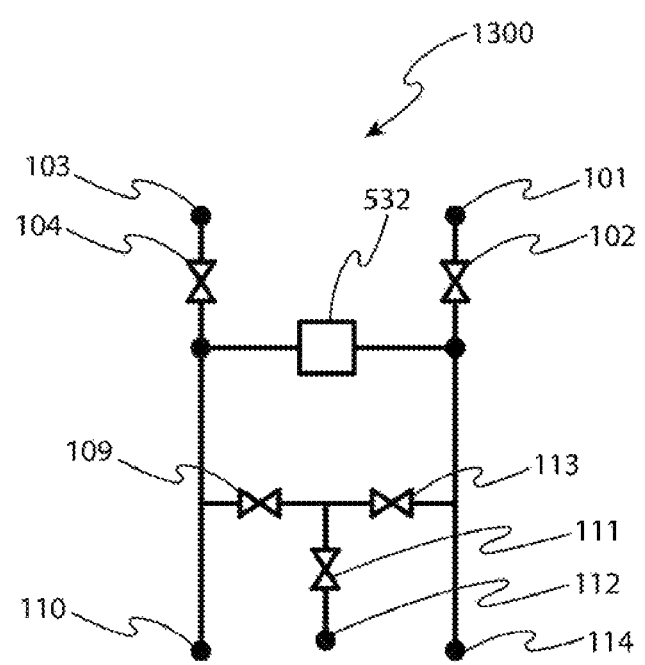
FIG. 13 is hydraulic circuitry for a 5-valve configuration of a backflow testing device, according to preferred embodiments.

The backflow testing device 100, as shown in FIG. 1, comprises a 5-valve/5-connection device, and FIGS. 4 and 5, illustrate the device 100 with its housing hidden/removed. FIG. 4 is an illustration 400 of various components of the backflow device 100, as viewed from the front (with its housing enclosure hidden), and FIG. 5 is an illustration 500 of various components of the backflow device, as viewed from the back (again, with its housing enclosure hidden), according to preferred embodiments. For greater understanding of FIGS. 4 and 5, the hydraulic circuitry in FIG. 13 is provided, which corresponds to the hydraulic circuitry for the 5-valve/5-connection configuration of device 100, according to preferred embodiments.

Hoses (not shown) may be connected to each of the threaded fittings 110, 112, and 114, which are shown in FIGS. 4 and 5 attached to a pressure ports manifold 423. The threaded fittings 110, 112, and 114 comprise high side, bypass, and low side connections/ports, respectively. The pressure ports manifold 423 is preferably primarily used to exchange fluid between the high and low side of the gage (that is, between high side port 110 and low side port 114), and to and from the bypass port 112—which are capabilities useful for various field testing procedures, for example, for testing of Reduced Pressure Backflow Assemblies (RPBAs). The pressure ports manifold 423 comprises an uninterrupted fluid path between the high side connection/port (fitting) 110 and a high side inbound pipe 531; an uninterrupted fluid path between the low side connection/port (fitting) 114 and a low side inbound pipe 530; a fluid path between high side port 110 and low side port 114 having a valve controlled by the high pressure port knob 109, a valve controlled by the low pressure port knob 113, and a bypass port 112 with a bypass port valve controlled by the bypass port knob 111 positioned therebetween, consistent with the hydraulics circuitry shown in FIG. 13.

As shown in FIGS. 4 and 5, the high side sensor block (or manifold) 427 and the low side sensor block (or manifold) 428 preferably hold the differential pressure sensor 532 in place, with the high side sensor block 427 comprising an uninterrupted fluid path from the high side inbound pipe 531 to a high side outbound pipe 425 and an uninterrupted fluid path to a high side of the sensor 532, and the low side sensor block 428 comprising an uninterrupted fluid path from the low side inbound pipe 530 to a low side outbound pipe 424 and an uninterrupted fluid path to a low side of the sensor 532. The high side sensor block 427 preferably exposes the high side of the differential pressure sensor 532 to fluid and fluid pressure from the high side port 110, and the low side sensor block 428 preferably exposes the low side of the differential pressure sensor 532 to fluid and fluid pressure from the low side port 114.

The bleed ports manifold 422 shown in FIGS. 4 and 5 preferably direct air and water (fluid) out of the gage (out of device 100) and into either the environment directly or through bleed port hoses (not shown) that may be connected to either or both of the high side bleed port/connection 103 and low side bleed port/connection 101. The bleed ports manifold 422 preferably comprises a fluid path from the high side outbound pipe 425 to the high side bleed port/connection 103, a valve controlled by high side bleed port knob 104 for controlling fluid flow through the high side bleed port/connection, a fluid path from the low side outbound pipe 425 to the low side bleed port/connection 101, and a valve controlled by low side bleed port knob 102 for controlling fluid flow through the low side bleed port/connection, consistent with the hydraulics circuitry shown in FIG. 13. A primary use of the bleed ports manifold, in preferred embodiments, is to ensure there is no air in the device fluid lines while taking pressure measurements.

In preferred embodiments, the differential pressure sensor 532 converts the high side fluid pressure and the low side fluid pressure into a pressure differential, which is then communicated to a printed circuit board (PCB) 429 via an electrical signal. The PCB 429 is preferably positioned between the display 168 and batteries 533 used for providing electrical power to the device 100. The PCB 429 preferably includes all the electrical components necessary to receive sensor and user/technician inputs from buttons 105, 106, and 107, process those inputs in the CPU and generate outputs useful to the user/technician via a piezoelectric buzzer 426 and LCD (display) 168. The buzzer 426, in preferred embodiments, provides audio feedback to the user/technician when certain actions or events have been performed and understood by the logic of the device 100 firmware. For example, a beep may be sounded for the capturing of a measurement via the capture button 105.

The present inventors discovered novel and effective placement and features for the display 168 in the backflow testing device 100. FIG. 1 illustrates a preferable proportion and placement of the display 168, preferably a large display covering a large portion of the front 170 of the device and centrally positioned below the capture button 105 and back button 106, and positioned so as not to be covered or hidden when the device 100 is held in the technician's hand. The present inventors further discovered placement of the display 168 on the front 170 of device 100 so that the sensor 532 is positioned (behind the display 168 and) in line with the rate of change graph (ROCG) 602 (described in greater detail below with respect to FIG. 6) provides the user/technician with an indication of the position of the sensor within the device 100 and establishes an elevation of the field test kit (backflow testing device), helping the user/technician position the gage appropriately during testing. The USC FCCCHR discloses, for certain testing procedures, keeping the field test kit and unused hoses at an appropriate elevation with respect to a visible downstream reference point such as a test cock or water level in a sight tube, if used. The present inventors discovered that placement of the rate of change graph 602 so that the horizontal graphical display comprising the rate of change graph 602 provides a (horizontal line) visual indication of the elevation of the testing gage allows for easier alignment of the elevation of the testing gage with a visible downstream reference point.

Figure 6:
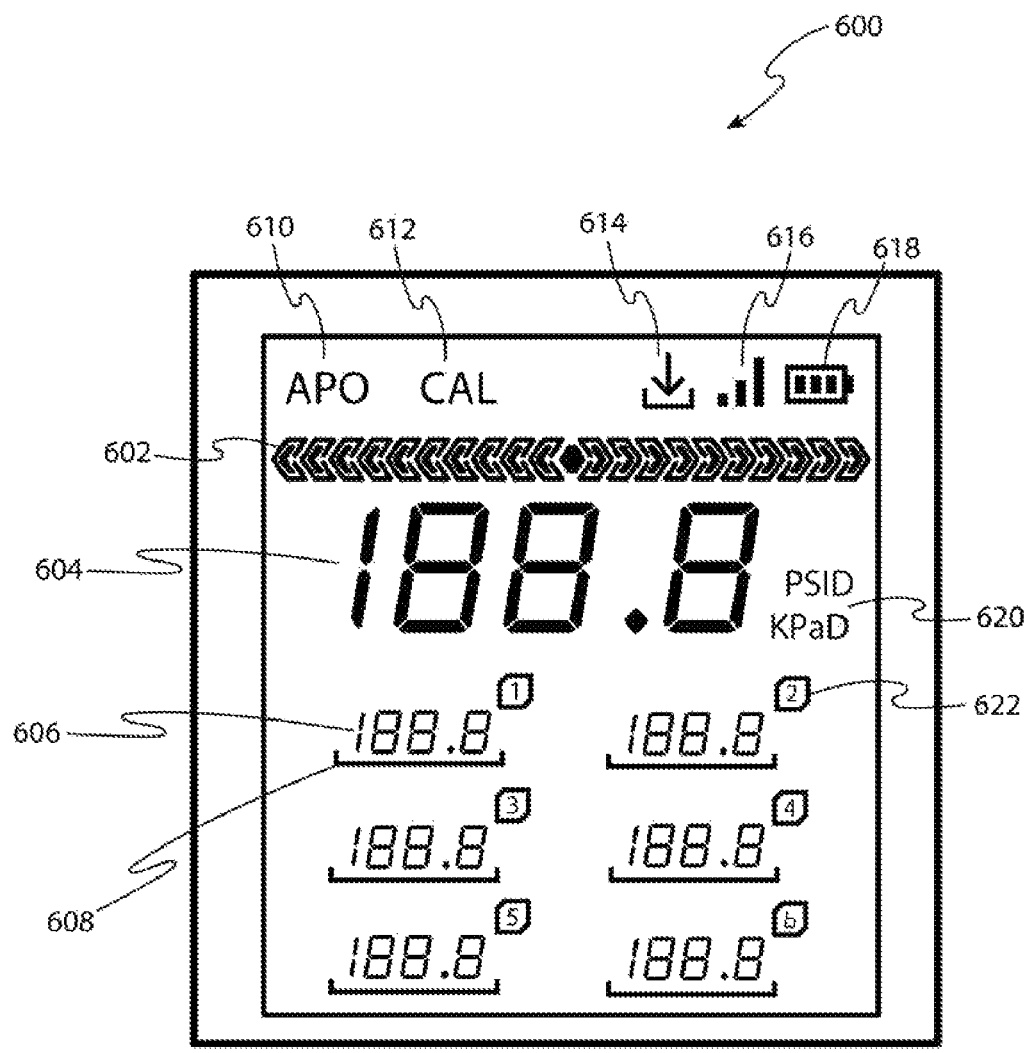
FIG. 6 depicts exemplary display graphics for a backflow testing device, according to preferred embodiments.

The present inventors discovered novel and especially useful graphics and features utilizing the display 168. FIG. 6 depicts exemplary display graphics 600 for a backflow testing device, according to preferred embodiments. The display graphics 600 preferably comprise a main display 604 comprising large (easy to view from a distance) numeric presentation of a current, live reading of the differential pressure, with a units indication 620 whether the reading is being displayed in PSID (pounds per square inch differential) or KPaD (kilopascals differential). In preferred embodiments, the units indication 620 may be toggled between readings in PSID and KPaD by holding down the capture button 105 while powering on the unit via power/backlight button 106, and the power/backlight button 106 toggles the display backlight on and off by briefly pressing and releasing the power/backlight button 106.

The present inventors discovered improvements in the information provided to the technician in providing that, in most preferred embodiments, the main display 604 comprise a continuous live reading of the pressure differential being sensed between the high side fluid line and the low side fluid line. That is, the main display 604 provides a current, live reading (measurement) display of the differential pressure free from a hold button or hold function such as those used on conventional/existing digital electronic backflow testing devices. The present inventors discovered and invented a capture value function preferably comprising a capture button 105 that, instead of freezing the active/current/live readings display (such as by using a hold button), is used to capture (and separately display) a differential pressure reading value. The present inventors developed a captured value function whereby a captured value 606 is displayed below the main (live reading) display 604, with the live reading display 604 being uninterrupted, continuing to display a live pressure differential reading. Preferably, more than one value may be captured and separately displayed. As shown in FIG. 6, an active position cursor 608 is preferably used to show which position the next captured value will be saved to, and a captured value identifier (ID) 622 provides a label for the captured value (or a capture position for the captured value). In preferred embodiments, and as shown in the exemplary graphics display 600, up to six captured values may be displayed, each with a captured value ID 622, while the main display 604 continues to display the current, real time live reading from the differential pressure sensor. In preferred embodiments, a back button 106 (as shown in FIG. 1) is used to clear previously captured values. For example, the technician may press the back button 106 once to delete the previous captured value and hold the back button 106 down for 1.5 seconds to clear all captured values. In other embodiments, the back button 106 may be configured to move the active position cursor 608 to a particular captured value, to be overwritten using the capture value button 105 or deleted by pressing the back button 106. In still other embodiments, other combinations of pressing and holding the back button 106 may be used to manage the captured values displayed on display 168.

The present inventors discovered and invented a rate of change graph (ROCG) 602 preferably displayed immediately above the current, live reading of the main display 604, whereby the rate of change graph provides the technician with an immediate visual indication of how quickly and in which direction (up or down) the differential pressure measurement is changing. As illustrated and described below with respect to FIGS. 10, 11, and 12, when a reading is stable (no change in differential pressure) the ROCG bar 602 will have a single dot (filled in) in the middle; when differential pressure is increasing, the ROCG 602 will comprise a number of filled in arrows (or chevrons) to the right proportionate to the rate of increase; and when differential pressure is decreasing, the ROCG 602 will comprise a number of filled in arrows to the left proportionate to the rate of decrease. The present inventors discovered the rate of change graph (ROCG) is especially useful for helping the technician determine the moment the relief valve on a reduced pressure backflow assembly (RPBA) opens, and is useful to help the technician get a feel for stable and unstable water pressures for determining when a test will yield good results and when the pressure is too volatile to perform a good test.

Moreover, as previously mentioned, in preferred embodiments the ROCG bar 602 is positioned in line with the pressure sensor 532 to help the user/technician orient the backflow testing device 100 in relation to the backflow prevention assembly being tested. In preferred embodiments, the middle dot between right and left pointing arrows comprising the ROCG bar 602 is positioned within the display 168 so that the sensor 532 is physically located within the interior volume of device 100 to be substantially directly behind the middle dot 1021 (shown in FIGS. 10, 11, and 12) of the rate of change graph displayed on display 168.

Several indicators are preferably positioned along the top row of the display graphics 600. As shown in FIG. 6, an auto power off (APO) indicator 610 is preferably set (as a device default) to automatically power off the device after 30 minutes of inactivity in order to conserve battery life. The APO feature may be disabled (turning the APO indicator 610 off) by holding down the back button 106 while powering on the device. A calibration (CAL) indicator 612 is preferably included to show when the unit is currently in calibration mode. A download indicator 614 is preferably included to show that a firmware update is being downloaded into the device. A wireless connection indicator 616 is preferably included to show that the device is currently connected to a mobile device, such as when the backflow device is connected to an associated app (downloaded to and operating on the wirelessly connected mobile device) for downloading new firmware, calibrating the backflow testing device, receiving measurement and data from the backflow testing device, or any time the device 100 is transmitting or receiving information with a mobile device. And a battery life indicator 618 is preferably included to show approximate battery life remaining. In preferred embodiments, when battery life reaches zero bars, the empty battery icon will begin to blink at a rate of 1 Hz; and when battery life is critically low, a warning tone is played before the unit shuts down.

Figure 7:
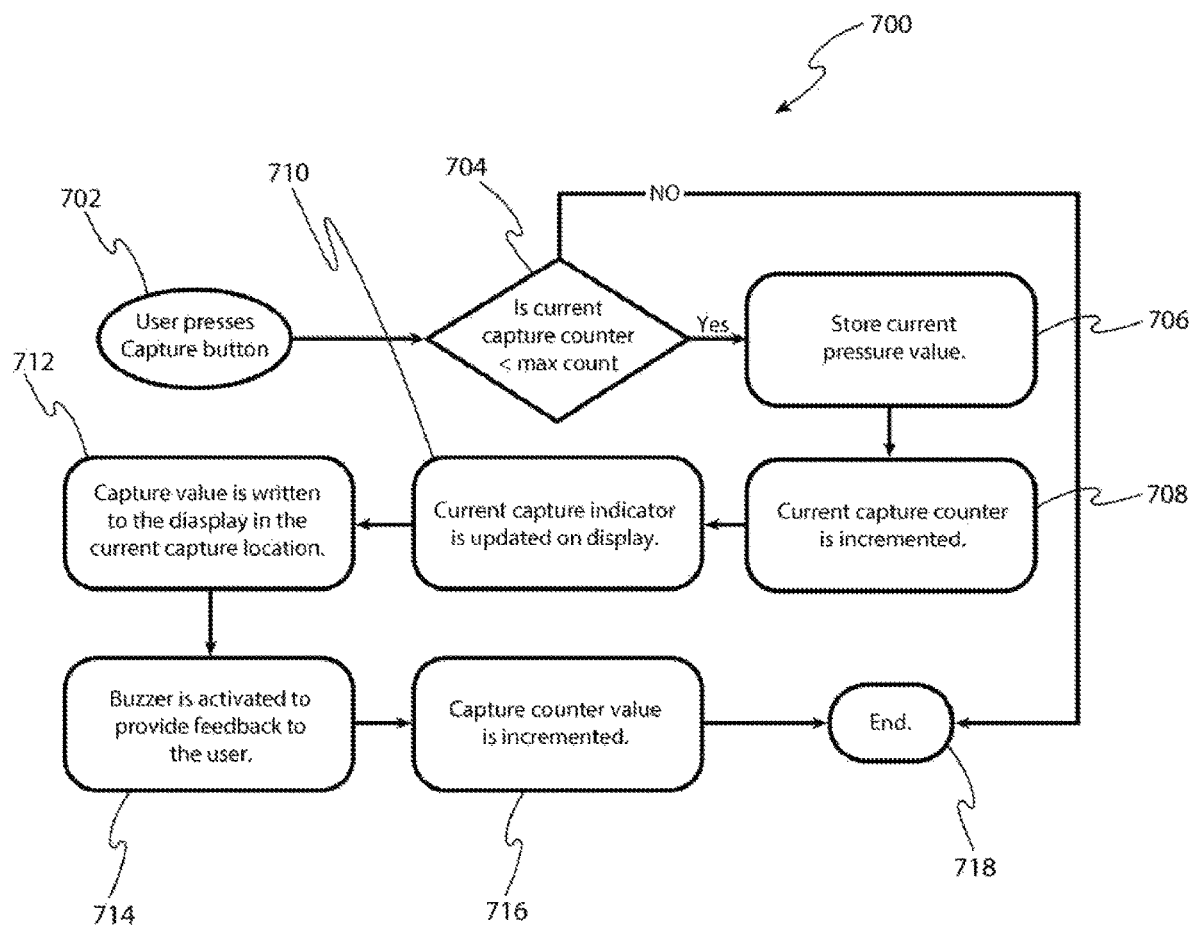
FIG. 7 is a flow diagram for a capture button/capture value(s) process, according to preferred embodiments.

FIG. 7 is a flow diagram for a capture button/capture value(s) process 700, according to preferred embodiments. As shown, when a technician/user presses 702 the capture button, a determination 704 is made whether a current capture counter is less than a maximum count (such as, for example, six). If not, the process ends 718 since all available captured value locations are used (until cleared). If the current capture counter is less than the maximum, the current pressure value is stored 706, the current capture counter is incremented 708, the current capture location indicator is updated on the display 710, the captured value is written to the display in the current capture location 712, the buzzer is activated to provide audio feedback to the user/technician 714, the capture counter value is incremented 716, and then the process ends 718.

Figure 8:
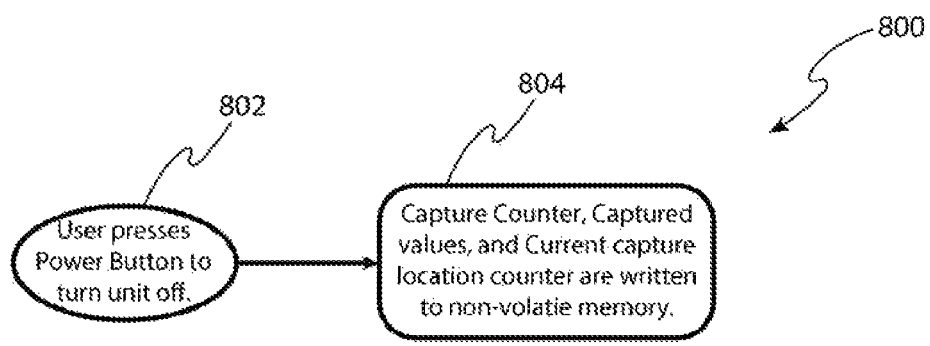
FIG. 8 is a flow diagram for a powering off process, according to preferred embodiments.

FIG. 8 is a flow diagram for a powering off process 800, according to preferred embodiments. As shown, when a user/technician presses 802 the power button to turn the unit off, the capture counter, captured values, and current capture location counter are written to non-volatile memory 804 before the unit shuts down. The information saved in memory is then available upon power up.

Figure 9:
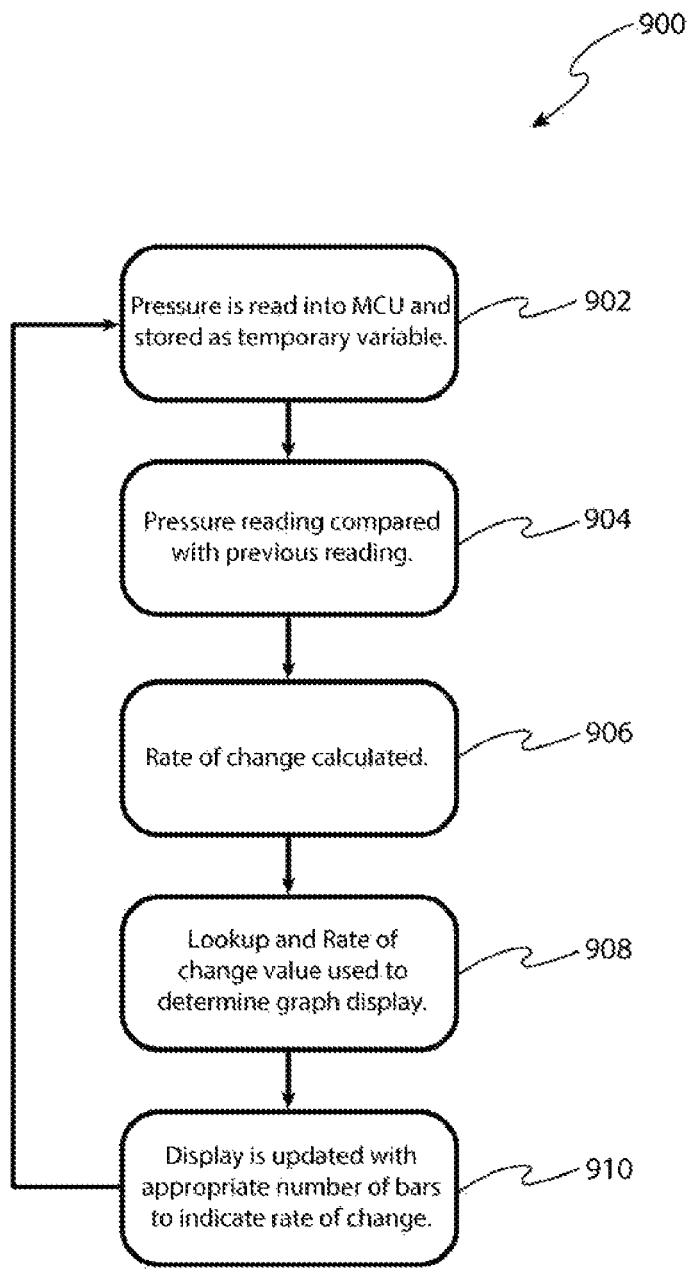
FIG. 9 is a flow diagram for a rate of change graph (ROCG) process, according to preferred embodiments.

FIG. 9 is a flow diagram for a rate of change graph (ROCG) process 900, according to preferred embodiments. As shown, pressure is read into the MCU and stored as a temporary variable 902. The pressure reading is then compared with the previous reading 904, and a rate of change is calculated 906. A lookup table and the calculated rate of change are used to determine a graph display 908, and the display is updated with an appropriate number of bars (filled in arrows) to indicate rate of change. And the process repeats, whereby pressure is (again) read into the MCU and stored as a temporary variable 902.

Figure 10:
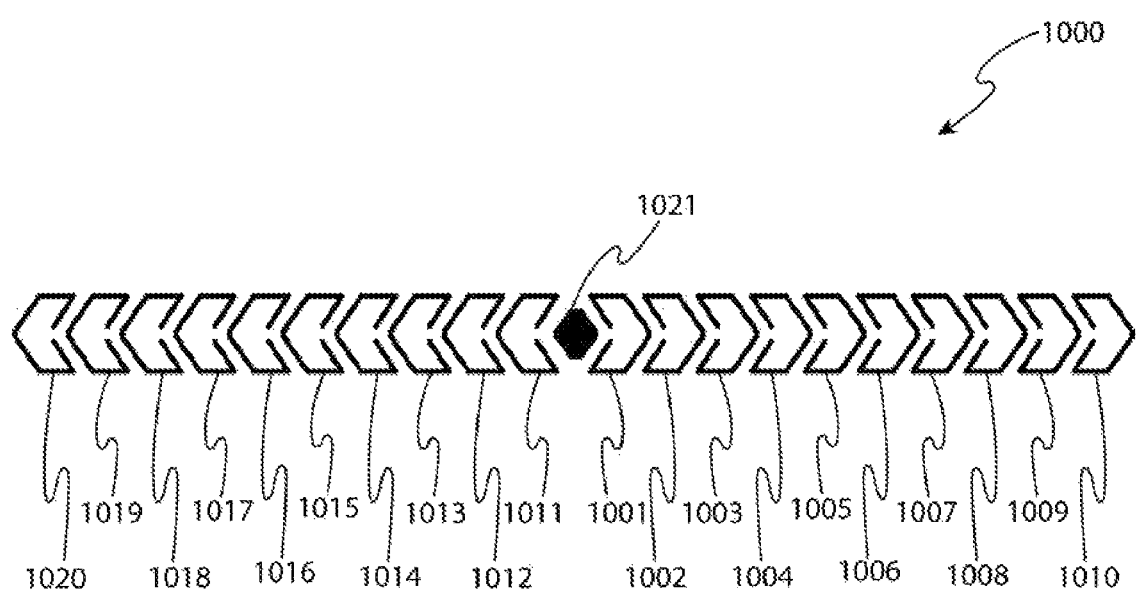
FIG. 10 illustrates an exemplary rate of change graph display showing a stable pressure differential, according to preferred embodiments.
Figure 11:
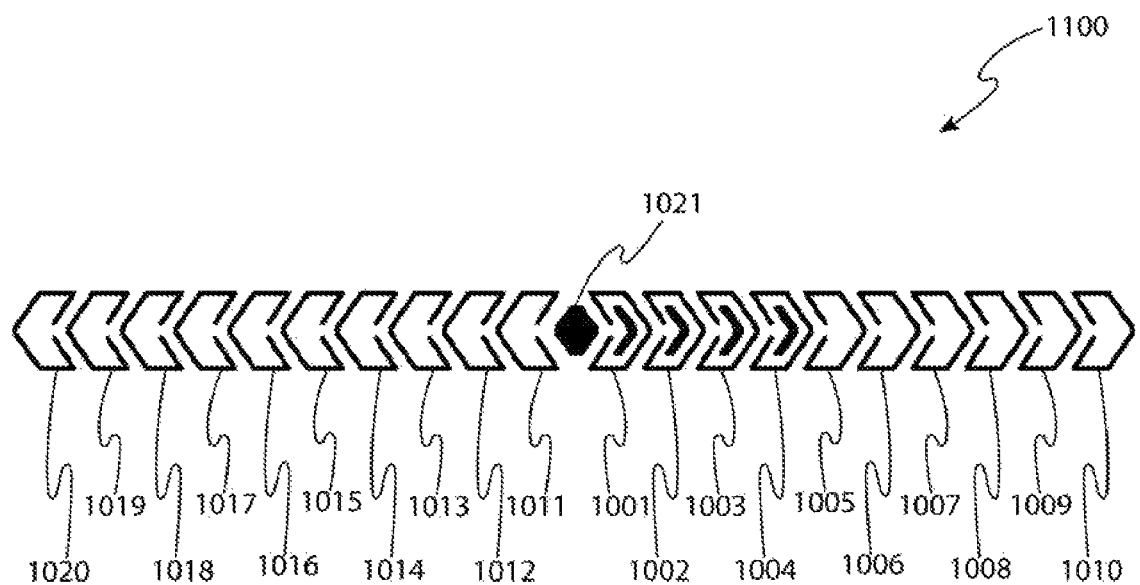
FIG. 11 illustrates an exemplary rate of change graph display showing an increasing pressure differential, according to preferred embodiments.
Figure 12:
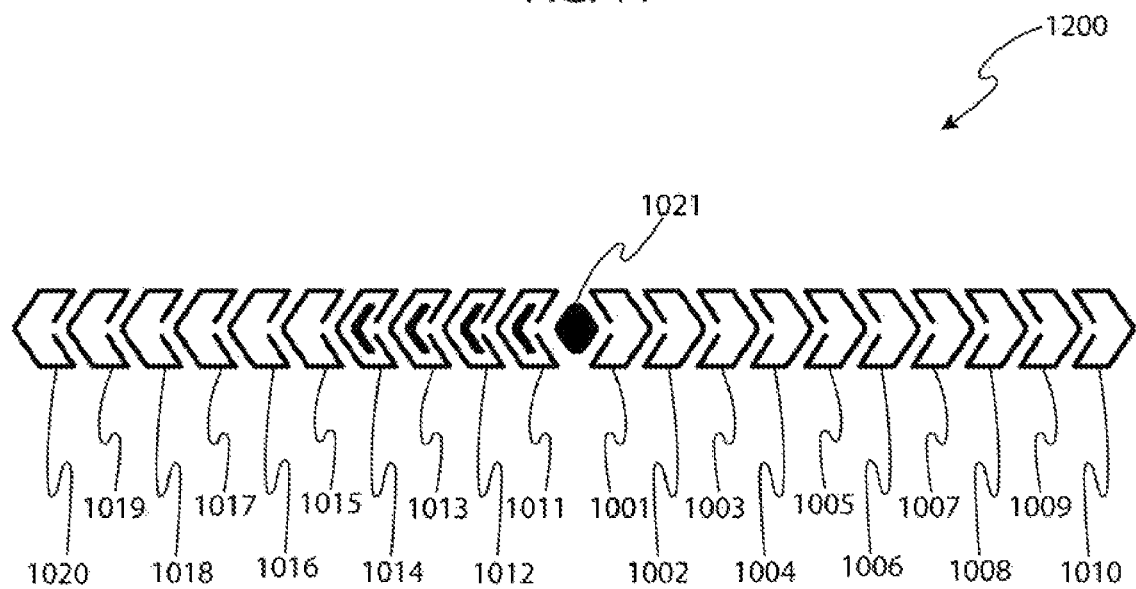
FIG. 12 illustrates an exemplary rate of change graph display showing a decreasing pressure differential, according to preferred embodiments.

FIGS. 10, 11, and 12 are exemplary rate of change graph (ROCG) 602 displays for stable, increasing, and decreasing pressure differential, respectively. FIG. 10 illustrates an exemplary rate of change graph display 1000 showing a stable pressure differential, according to preferred embodiments. As shown, when the pressure differential is stable (not changing), the middle dot (or diamond) 1021 is filled in and the rest of the (ten) arrows (1001 through 1010) to the right and (ten) arrows (1011 through 1020) to the left are left unfilled. Or, when the pressure differential is relatively (more or less) stable, there may be one or two arrows filed in either direction. For example, and not shown, a rate of change graph having the middle dot 1021 and arrow 1001 filled in, with the rest of the arrows unfilled, would represent a stable pressure differential. In preferred embodiments, the first arrow (1001 and 1011) on each side of the middle dot 1021 show a change in pressure of +/−0.05 PSID/second. More or less arrows may be used, and the shapes need not be as shown (as arrows).

FIG. 11 illustrates an exemplary rate of change graph display 1100 showing an increasing pressure differential, according to preferred embodiments. As shown, when the pressure is increasing, the arrows 1001, 1002, 1003, and 1004 on the right side will be darkened (in addition to the middle dot 1021). The faster the pressure differential is increasing, the more arrows to the right of the middle dot 1021 will be darkened (filled).

FIG. 12 illustrates an exemplary rate of change graph display 1200 showing a decreasing pressure differential, according to preferred embodiments. As shown, when the pressure reading is decreasing, the arrows 1011, 1012, 1013, and 1014 on the left side will be darkened. The faster the pressure differential is decreasing, the more arrows to the left of the middle dot 1021 will be filled (darkened).

Figure 14:
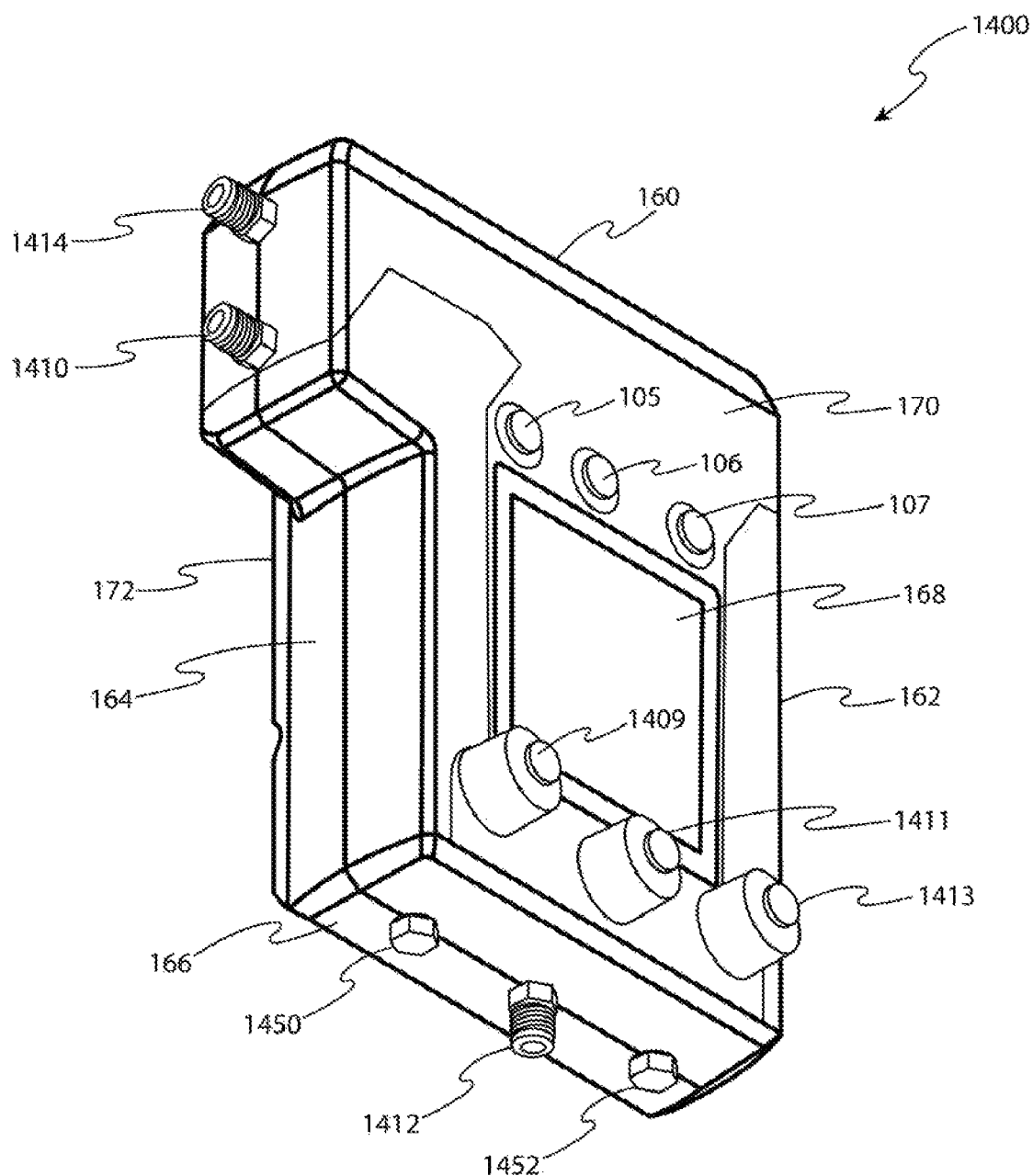
FIG. 14 is a front/left/bottom perspective view of a 3-valve configuration of a backflow testing device, according to preferred embodiments.
Figure 15:
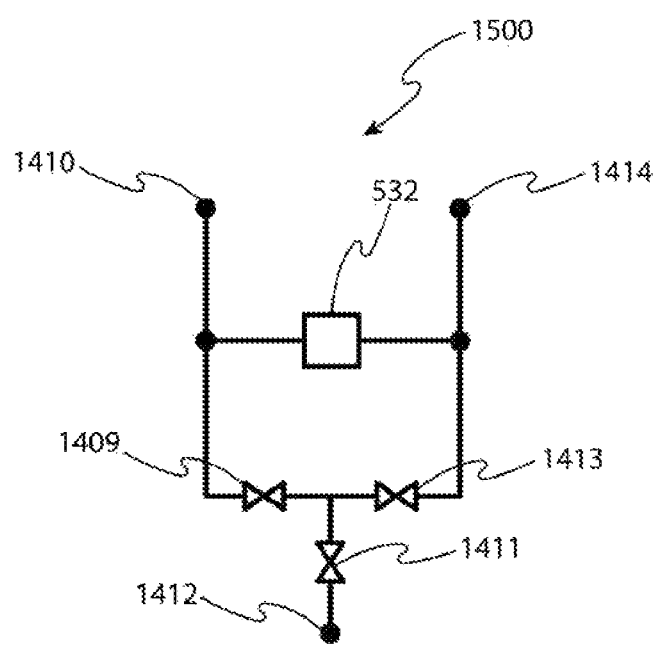
FIG. 15 is hydraulic circuitry for a 3-valve configuration of a backflow testing device, according to preferred embodiments.
Figure 16:
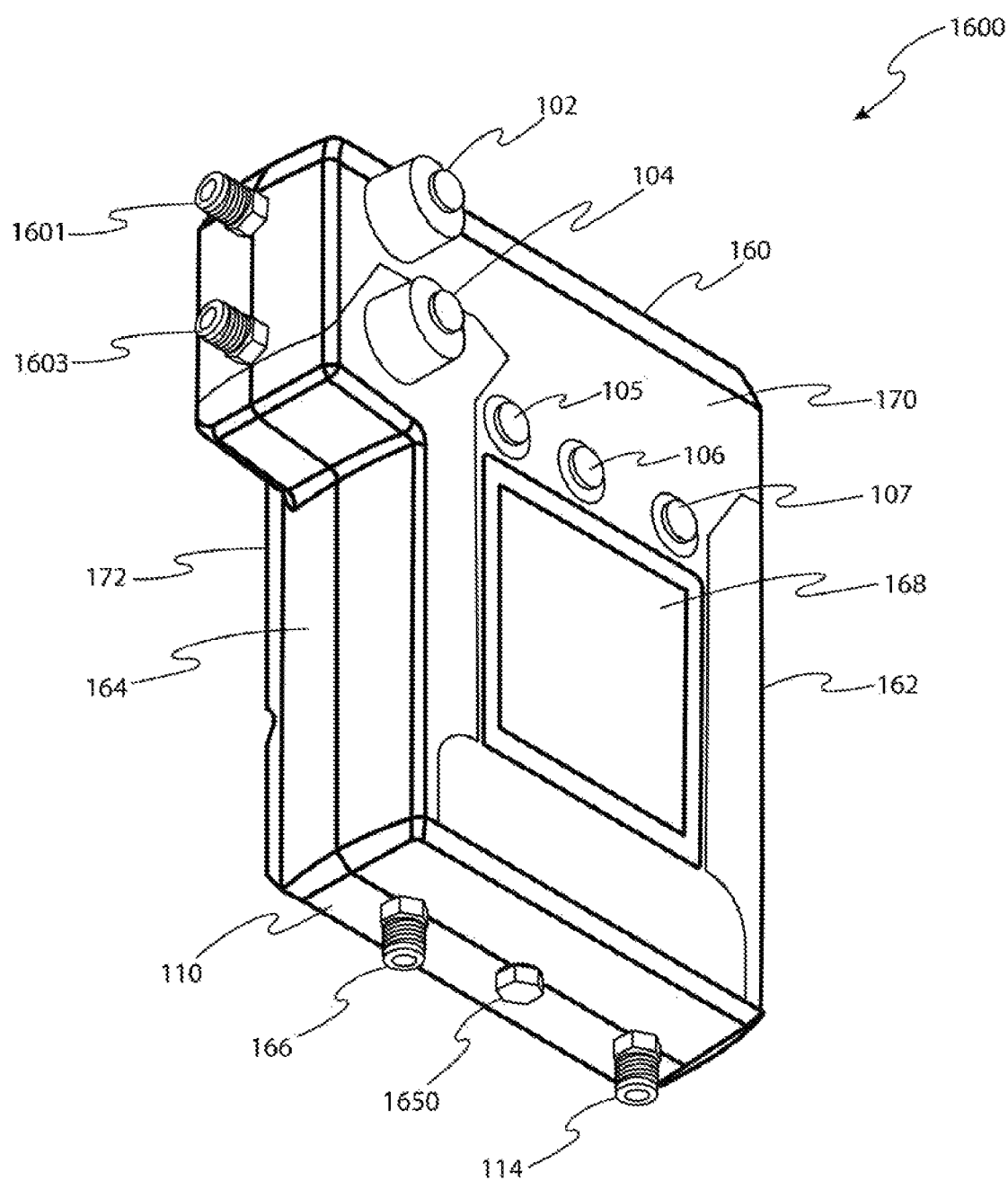
FIG. 16 is a front/left/bottom perspective view of a 2-valve configuration of a backflow testing device, according to preferred embodiments.
Figure 17:
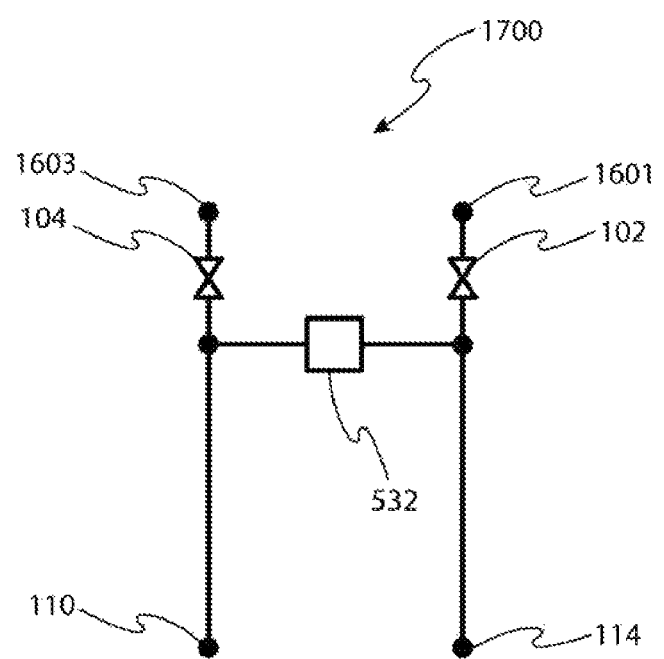
FIG. 17 is hydraulic circuitry for a 2-valve configuration of a backflow testing device, according to preferred embodiments.

Turning now to FIGS. 13-17, the present inventors discovered that simple variants of the full 5-valve and 5-connection device 100, which corresponds to the hydraulic circuitry in FIG. 13, may comprise a 3-valve/3-connection device 1400 described in FIGS. 14-15 and a 2-valve/4-connection device 1600 described in FIGS. 16-17, such that each of the devices 100, 1400, and 1600 conform with industry specified testing instructions such as those set out in the USC FCCCHR. For simplicity of description with respect to the hydraulic circuitry in FIGS. 13, 15, and 17, references to ports/connections and fittings are combined, and references to valves and knobs are combined. For example, FIG. 13 comprises hydraulic circuitry for the 5-valve/5-connection device 100 in FIG. 1, according to preferred embodiments. The knobs 102, 104, 109, 111, and 113 shown in FIG. 1 correspond to the valves they control, respectively, to the valves 102, 104, 109, 111, and 113 shown in FIG. 13. The ports (or connections) 103 and 101 shown in FIG. 1 as bleed ports or bleed port tubing fittings, are shown as simply connections 103 and 101 in FIG. 13. And the ports (or connections) 110, 112, and 114 shown in FIG. 1 as high side, bypass (or vent), and low side ports, respectively, each comprising a threaded fitting, are shown as simply connections/ports 110, 112, and 114 in the hydraulic circuitry in FIG. 13.

The present inventors discovered that the same housing used for the device 100 shown in FIG. 1 may be used for a 3-valve/3-connection configuration/version 1400 illustrated in FIG. 14, with corresponding hydraulic circuitry 1500 shown in FIG. 15. The same housing is used for both the 5-valve device 100 and the 3-valve device 1400. For the 3-valve device 1400, closure caps 1450 and 1452 replace the threaded fittings shown in those locations for the 5-valve device 100. Where device 100 included bleed ports, the 3-valve device 1400 uses those connections as the high side port/connection (threaded fitting) 1410 and low side port/connection (threaded fitting) 1414. And the 3-valve device 1400 comprises a high side pressure port knob 1409, a low side pressure port knob 1413, and a bypass (or vent, or bleed) port knob 1411 with bypass (or vent, or bleed) port (threaded fitting) 1412.

The present inventors further discovered that the same housing used for the device 100 in FIG. 1 (and used for the device 1400 in FIG. 14) may be used for a 2-valve/4-connection configuration/version 1600 illustrated in FIG. 16, with corresponding hydraulic circuitry 1700 shown in FIG. 17. The same housing is used for the 5-valve device 100, the 3-valve device 1400, and the 2-valve device 1600. For the 2-valve device 1600, a closure cap 1650 replaces the threaded fitting shown in that (bypass) location for the 5-valve device 100 and the 3-valve device 1400. Where device 100 included high side and low side bleed ports with bleed port tubing fittings, the 2-valve device includes high side 1603 and low side 1601 bleed ports with threaded fittings (so that a bypass hose may be used with ports 1603 and 1601).

The present inventors developed each of the aforementioned 5-valve device 100, 3-valve device 1400, and 2-valve device 1600 to be able to perform all standard backflow testing procedures including those from USC FCCCHR, ABPA, NEWWA, AWWA, UF TREEO, and ASSE.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A handheld-sized, battery-powered backflow testing device comprising:
    (a) a first fluid line connectable to a first source of fluid and a first fluid pressure therefor;
    (b) a second fluid line connectable to a second source of fluid and a second fluid pressure therefor;
    (c) at least one pressure sensor fluidly connected to said first and said second fluid lines;
    (d) electrical circuitry configured to provide real time differential pressure measurements between said first and said second fluid lines;
    (e) electrical circuitry and an electronic display configured to display said real time differential pressure measurements;
    (f) a capture value button and electrical circuitry configured to capture a differential pressure measurement as a captured value when said capture value button is depressed without interrupting said display of said real time differential pressure measurements; and
    (g) a battery power supply electrically interconnected with said at least one pressure sensor, said electronic display, and the electrical circuitry associated with said capture value button.

2. The device of claim 1, further comprising electrical circuitry configured to display said captured value and continue said uninterrupted display of said real time differential pressure measurements.

3. The device of claim 1, further comprising electrical circuitry configured to store in memory and display more than one captured value and continue said uninterrupted display of said real time differential pressure measurements.

4. The device of claim 1, wherein said at least one pressure sensor comprises a differential pressure sensor in fluid communication with said first and said second fluid lines and configured to measure a pressure differential between said first and said second fluid lines.

5. The device of claim 1, further comprising electrical circuitry configured to perform an algorithm to generate and display a rate of change graph that provides a visual indication as to how fast said real time differential pressure measurements are changing, and whether a direction of change is increasing or decreasing, or neither.

6. The device of claim 1, further comprising electrical circuitry configured to permit wireless transmission and reception of data.

7. The device of claim 6, further comprising electrical circuitry configured to permit wireless connection to a mobile device whereby calibration of said backflow testing device is controllable remotely using said mobile device.

8. The device of claim 1, further comprising electrical circuitry configured to permit saving in memory and wirelessly transmitting said captured value and a captured value identifier corresponding to said captured value.

9. The device of claim 1 further comprising a handheld-sized housing enclosure having a top, a bottom, a left side, a right side, a front, and a back defining an interior volume of the enclosure, wherein the enclosure comprises the first fluid line, the second fluid line, the at least one pressure sensor, the electrical circuitry configured to provide real time differential pressure measurements between said first and said second fluid lines, the electrical circuitry and electronic display configured to display said real time differential pressure measurements, the capture value button and electrical circuitry configured to capture the differential pressure measurement as the captured value when said capture value button is depressed without interrupting said display of said real time differential pressure measurements, and the battery power supply electrically interconnected with said at least one pressure sensor, said electronic display, and the electrical circuitry associated with said capture value button.

10. The device of claim 9 wherein the enclosure further comprises electrical circuitry configured to display said captured value and continue said uninterrupted display of said real time differential pressure measurements.

11. The device of claim 9 wherein the enclosure further comprises electrical circuitry configured to store in memory and display more than one captured value and continue said uninterrupted display of said real time differential pressure measurements.

12. The device of claim 9 wherein said at least one pressure sensor comprises a differential pressure sensor in fluid communication with said first and said second fluid lines and configured to measure a pressure differential between said first and said second fluid lines.

13. The device of claim 9 wherein the enclosure further comprises electrical circuitry configured to perform an algorithm to generate and display a rate of change graph that provides a visual indication as to how fast said real time differential pressure measurements are changing, and whether a direction of change is increasing or decreasing, or neither.

14. The device of claim 9 wherein the enclosure further comprises electrical circuitry configured to permit wireless transmission and reception of data.

15. The device of claim 14 wherein the enclosure further comprises electrical circuitry configured to permit wireless connection to a mobile device whereby calibration of said backflow testing device is controllable remotely using said mobile device.

16. The device of claim 9 wherein the enclosure further comprises electrical circuitry configured to permit saving in memory and wirelessly transmitting said captured value and a captured value identifier corresponding to said captured value.

17. The device of claim 9 wherein the enclosure is configured to permit configuring hydraulic circuitry within said enclosure to provide a 2-valve backflow testing device.

18. The device of claim 9 wherein the enclosure is configured to permit configuring hydraulic circuitry within said enclosure to provide a 3-valve backflow testing device.

19. The device of claim 9 wherein the enclosure is configured to permit configuring hydraulic circuitry within said enclosure to provide a 5-valve backflow testing device.

20. The device of claim 9 wherein the enclosure is configured to permit configuring hydraulic circuitry within said enclosure to provide any one of a 2-valve backflow testing device, a 3-valve backflow testing device, or a 5-valve backflow testing device.

* * * * *